Aug. 8, 1939.  H. GEORGE, 3D  2,168,867
METHOD AND APPARATUS FOR TESTING THE CONTENTS OF
THE STOMACH AND OTHER BODY CAVITIES
Filed Aug. 5, 1937
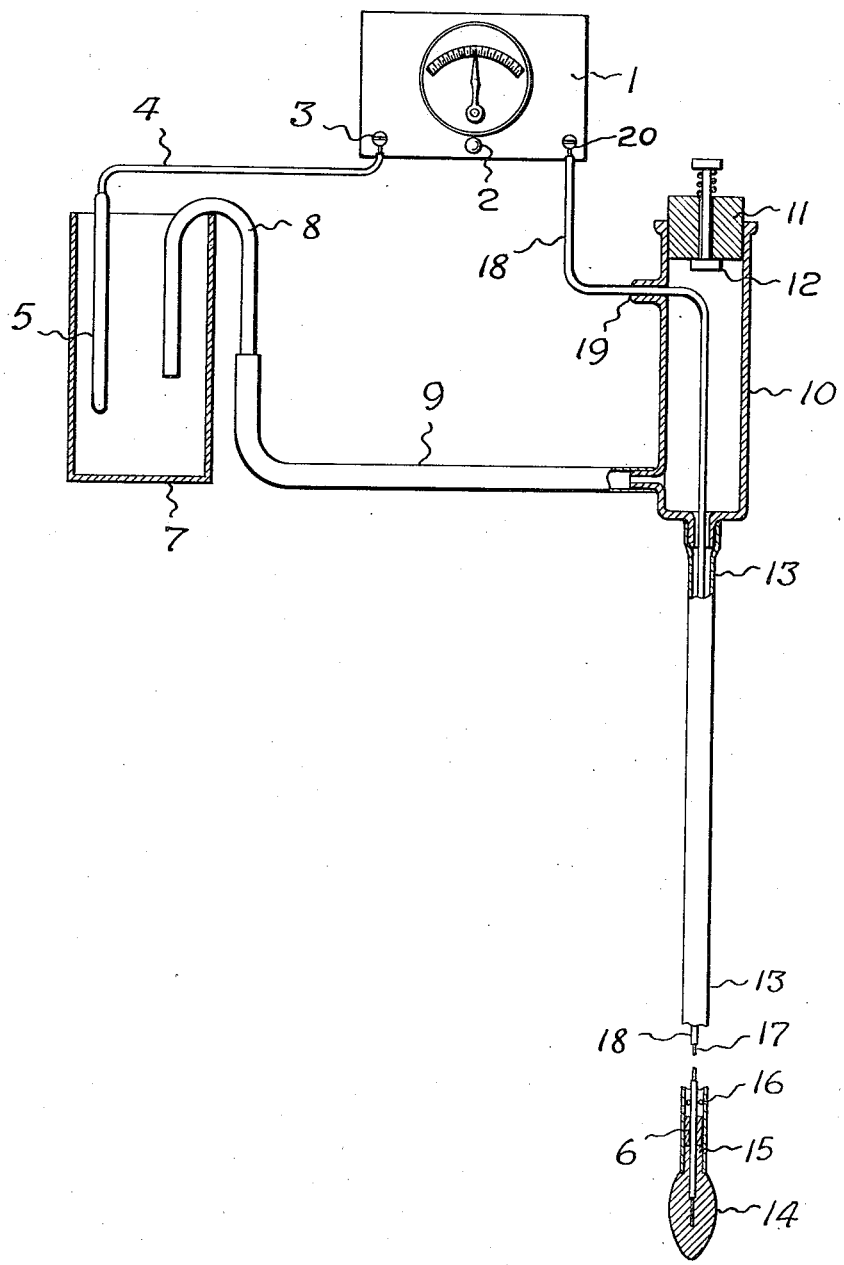
INVENTOR
Henry George, Third
BY
ATTORNEY Patented Aug. 8, 1939

2,168,867

UNITED STATES PATENT OFFICE 2,168,867

METHOD AND APPARATUS FOR TESTING THE CONTENTS OF THE STOMACH AND OTHER BODY CAVITIES

Henry George, III, Wilmington, Del., assignor to Takamine Ferment Company, New York, N. Y., a corporation of West Virginia Application August 5, 1937, Serial No. 157,560

8 Claims. (Cl. 128—2)

This invention relates to a method and apparatus for use in testing and indicating the acidity, alkalinity, neutrality, or other condition of the juices, fluids, or other contents of the stomach and of the entire gastro-intestinal tract; and while this method and apparatus are particularly adapted for use in determining the pH of the stomach contents they may also be used, or adapted for use, in testing or determining the condition of the fluid or other contents of other natural cavities, channels, or orifices in the body, such as—for example—the vaginal, nasal, and other channels.

In testing the pH of the stomach contents, a usual practice has heretofore been to employ a stomach tube which is passed down the throat so that a portion of the stomach contents may be withdrawn by suction through such tube. The material thus withdrawn is then tested by any known method, for example, by titration or by means of a potentiometer having one terminal connected to an electrode in contact with the said material while a second terminal is connected to an electrode in contact with a buffer solution of known quality and a circuit is completed between the said electrodes by means of a conduit including an agar bridge so that the potentiometer may be caused to indicate the potential difference and thus indicate the pH of the material being tested.

In the testing of stomach juices it has also been heretofore proposed to enclose two metallic leads in a flexible tube adapted to be introduced into the stomach so that two electrodes of different metals such as platinum and zinc may both contact with the stomach contents and may generate an electric current that can be indicated on an electrical measuring device attached to the said metallic leads.

One object of my present invention, however, is to provide a method whereby a single electrode is introduced into the stomach or other cavity, channel or orifice and whereby a neutral fluid in a flexible tube is also introduced so that a circuit may be completed through the said fluid and through an insulated metallic lead connected to the electrode, the circuit including a buffer solution and a potentiometer so that the potential difference measured by the potentiometer indicates the pH in the stomach or other cavity, channel, or orifice.

Another object of my invention is to provide an improved apparatus comprising a potentiometer connected by a flexible lead to an antimony electrode adapted to be introduced into the stomach, or other cavity, channel, or orifice, with a flexible tube supplying a neutral fluid such as a potassium chloride solution to a point in proximity to the said electrode. A still further object of my invention is to provide for the introduction of a flexible tube containing a neutral fluid and also containing an insulated lead connected to an electrode and to a potentiometer in combination with a second electrode of the same metal connected to the potentiometer and immersed in a known buffer solution, cooperating with the said neutral fluid.

With these and other objects in view the present invention consists in the novel method and in the improved apparatus having the construction and arrangement of parts hereinafter described, illustrated in the accompanying drawing and particularly pointed out in the appended claims, it being understood that various changes in the method and apparatus may be made without departing from the spirit of the invention or sacrificing any of the advantages thereof.

The drawing shows a diagrammatic view of a preferred form of the apparatus.

Referring to the drawing, a potentiometer 1 is provided with a switch or control button 2 and is preferably in the form of a "Wheatstone bridge."

The terminal 3 of the potentiometer is connected by means of a lead 4 with an antimony reference electrode 5, immersed in a buffer solution in a vessel 7. This buffer solution communicates through the medium of an agar bridge 8 and a conduit 9 with the lower part of a vessel 10 having a closure 11 with a valve 12 for controlling the admission of air. A neutral fluid, preferably potassium chloride solution, is contained within the vessel 10 and conduit 9, and extending from the lower part of the vessel 10 is a flexible rubber or like tube 13 of substantial length. To the free end of the tube 13 there is secured an antimony electrode in the form of an "olive" 14 which is formed with a neck piece 15 upon which the end of the tube 13 is tightly secured and in close proximity to the olive 14 the tube 13 is formed with a number of small apertures 16 through which the fluid in the vessel 10 and tube 13 may escape when the air inlet valve 12 is opened. The "olive" 14 has secured thereto one end of a flexible metallic lead 17 which is enclosed within the tube 13, and is insulated from the fluid in the tube 13 by an insulating sleeve or covering 18. The electrode 14 is also separated by insulation 6 from the fluid within the tube 13. The lead 17 and its insulation 18 pass through the entire length of the tube 13 and through part of the vessel 10 which is provided with an opening 19 through which the sleeve 18 and lead 17 are passed and the opposite extremity of the lead 17 is secured to the second terminal 20 of the potentiometer 1.

In operation, the vessel 7 having been charged with a liquid of known characteristics and the vessel 10 having been charged with a neutral fluid such as a potassium chloride solution, the "olive" 14 is introduced in the known manner into the cavity, channel, or orifice to be investigated and when the "olive" 14 is in contact with the material to be tested, the valve 12 may be opened momentarily in order to permit a small quantity of solution to escape from the apertures 16 and at least to ensure that the said solution is present at the outer extremities of said apertures. The switch button 2 on the potentiometer is then pressed with the result that the potentiometer indicates the potential difference between the antimony electrode 5 in contact with the known medium in the vessel 7 and the antimony electrode or "olive" 14 in contact with the medium in the stomach or other cavity, channel, or orifice, so that the conditions, more particularly the pH, of the stomach juices or other medium in contact with the said electrode 14 is determined by the potentiometer.

In carrying out my invention I preferably employ for the neutral fluid in the tube 13 and container 10 potassium chloride saturated in distilled water at room temperature, and for the buffer solution in the vessel 7 I preferably employ an ordinary commercial buffer solution of preferably five or seven pH.

The "olive" 14 and the flexible tubing 13 may be modified to suit the particular purposes for which they are intended. For testing the stomach contents the "olive" 14 may be of suitable dimension for swallowing and the tube 13 may be made of small diameter and a high degree of flexibility, while for use in an apparatus intended for testing the contents of the colon or certain other cavities, channels, or orifices in the body the shape or dimensions of the "olive" may be suitably modified and the tube 13 may have sufficient rigidity to permit of the parts being thrust into the desired position; and the dimensions, shape and rigidity or flexibility of the parts may be suitably modified to suit the particular cavity, channel or orifice into which they must be introduced.

Although the drawing and the above specification disclose the best mode in which I have contemplated embodying my invention, I desire to be in no way limited to the details of such disclosure, for in the further practical application of my invention many changes in the form and construction and in the materials may be made as circumstances require or experience suggests without departing from the spirit of the invention within the scope of the appended claims.

What I claim is:

1. Apparatus for use in determining the pH of the juices or other fluid contents of the stomach or other body cavity, channel, or orifice which comprises an external receptacle containing a buffer solution of known characteristics, an electrode immersed therein, a column of a neutral solution adapted to extend into the said cavity, channel or orifice, a bridge connecting the said column with the buffer solution, an electrode located in the said cavity in close proximity to the inner end of the said column, a potentiometer connected to said electrodes to indicate the potential difference thereof, and a conductor extending through the said column and connecting the potentiometer with the electrode in the cavity.

2. Apparatus for use in determining the pH of the juices or other fluid contents of the stomach or other body cavity, channel, or orifice which comprises a vessel containing a buffer solution, an external electrode immersed in the solution, a column of a neutral fluid to extend into the cavity or orifice and contact with the contents thereof, an agar bridge connecting the neutral fluid with the buffer solution, a second electrode, means for locating the second electrode in close proximity to the internal extremity of the said column, an electric measuring instrument, and means for connecting both electrodes thereto, including a conductor accommodated in said column.

3. Apparatus for use in determining the pH of the juices or other contents of the stomach or other body cavity, channel, or orifice which comprises a potentiometer, an external electrode connected thereto, an internal electrode similar to the external electrode, a tube for introducing the latter electrode into the cavity, channel, or orifice, a column of fluid in the tube and having an opening in close proximity to the inner electrode to permit the fluid to contact the medium being tested, a lead connecting the internal electrode with the potentiometer, means for insulating the said lead from the column of fluid, a buffer solution of known characteristics in contact with the external electrode, and a connection including an agar bridge between the said column and the buffer solution.

4. Apparatus for use in determining the pH of the juices or other fluid contents of the stomach or other body cavity, channel, or orifice which comprises an antimony "olive", an electric measuring instrument, a connection between the "olive" and the instrument, a tube surrounding said connection and containing a neutral fluid contacting with said contents, means for insulating said connection from said fluid, a reference electrode and means for connecting the latter electrode to the said instrument.

5. Apparatus for use in determining the pH of the juices or other fluid contents of the stomach or other body cavity, channel, or orifice which comprises a vessel containing potassium chloride solution, a tube attached to said vessel, an electrode attached to the free end of said tube and adapted to be introduced into the cavity, a measuring instrument, an electrical connection extending through the tube from the said electrode to the said instrument, means for insulating the said connection from the said solution, apertures in the said tube in close relation to the said electrode to permit passage of said solution from the tube to the medium being tested, a buffer solution, an agar bridge connecting the same with the said vessel, and a reference electrode located in said buffer solution and connected to said measuring instrument.

6. Apparatus for use in determining the pH of the juices or other fluid contents of the stomach or other body cavity, channel, or orifice which comprises a potentiometer, an antimony electrode connected thereto, a known buffer solution in contact with the electrode, a second antimony electrode in the form of an "olive", a tube connected to the "olive", an external vessel containing a neutral fluid and connected with the tube to supply the fluid thereto, a lead extending from the "olive" through said tube and vessel to the potentiometer, means for insulating said lead from the fluid, apertures in the said tube for permitting the fluid to contact with the medium being tested, and a connection including an agar bridge extending between the said external vessel and the buffer solution.

7. Apparatus for use in determining the pH of the contents of the stomach or other body cavity, channel, or orifice which comprises a vessel adapted to contain a neutral fluid, a tube attached to said vessel, an antimony electrode attached to the free end of said tube and adapted to be introduced into the cavity, channel, or orifice, an electric measuring instrument, an electrical connection extending through the said tube from the said electrode to the said instrument, means for insulating the said connection from the said neutral fluid, apertures in the said tube in close relation to the said electrode to permit passage of said fluid from the tube to the medium being tested when the tube is introduced into the cavity, channel, or orifice, a buffer solution, an agar bridge connecting the same with said fluid, and a reference electrode immersed in said solution and connected to said measuring instrument.

8. Apparatus for use in determining the pH of the contents of the stomach or other body cavity, channel, or orifice which comprises a potentiometer, an antimony electrode connected thereto, a vessel to contain a buffer solution for contact with the electrode, a second antimony electrode in the form of an "olive", a tube connected to the "olive", an external vessel for containing a neutral fluid and so connected with the said tube as to supply the fluid thereto, a metallic lead extending from the "olive" through said tube and vessel to the potentiometer, means for insulating said lead from the fluid, apertures in the said tube for permitting the fluid to contact with the medium being tested, valve means for controlling the passage of the fluid through said apertures, and a connection extending between the said external vessel and the vessel for containing the buffer solution.

HENRY GEORGE, III.